Patented May 26, 1942

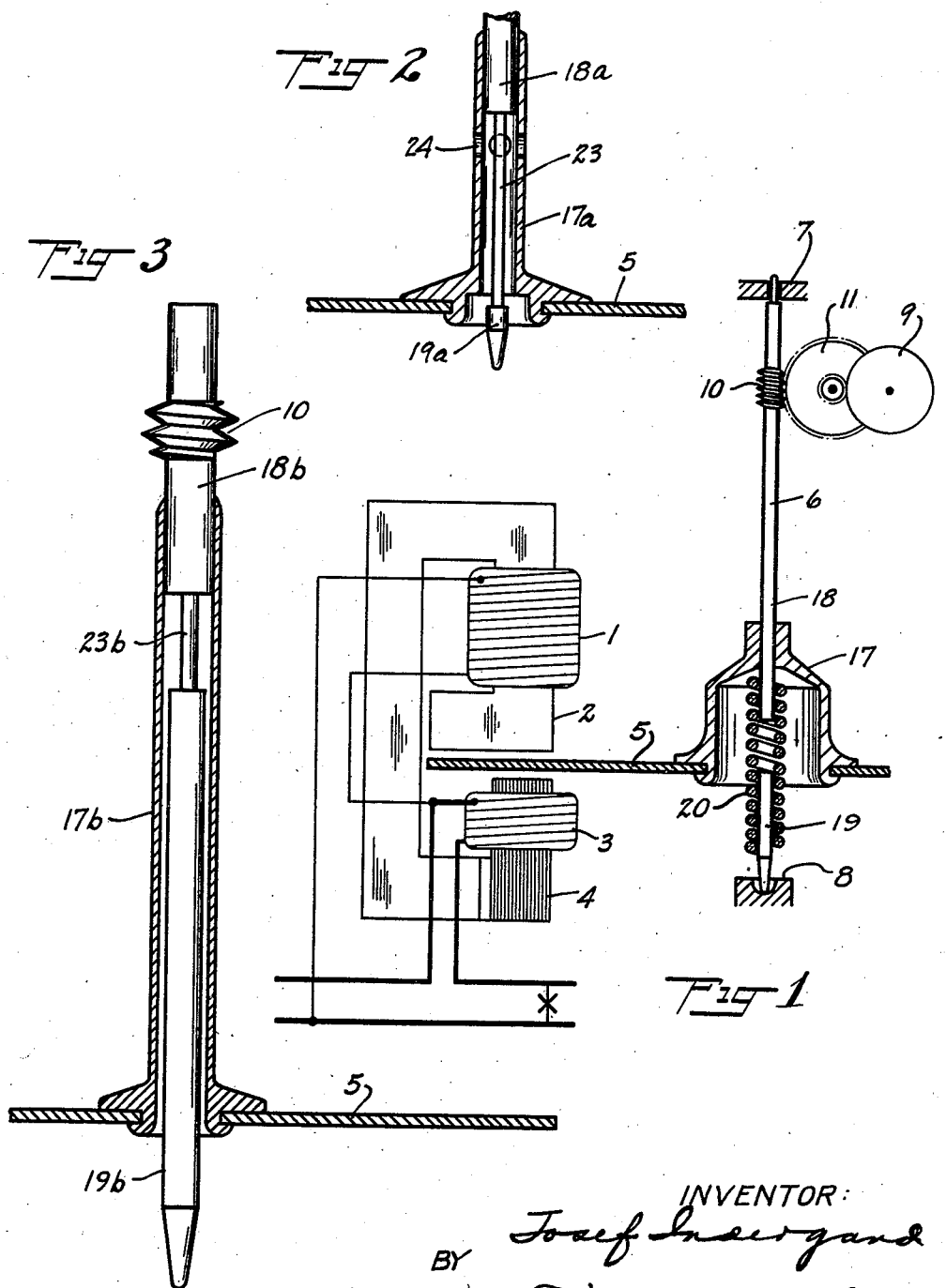

2,284,428

UNITED STATES PATENT OFFICE 2,284,428

ELECTRICITY METER

Josef Indergand, Zug, Switzerland, assignor to Landis & Gyr, A-G., Zug, Switzerland, a corporation of Switzerland Application November 8, 1938, Serial No. 239,474
In Switzerland November 15, 1937

3 Claims. (Cl. 308—159)

The invention relates to new and useful improvements in electricity meters, and more particularly to such improvements in the driven spindle and disc construction in order to eliminate undesirable noise and motion, due to the driving of said parts.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serve to explain the principles of the invention.

Of the drawing:

Fig. 1 is an elevation, partly in section and partly diagrammatic, of a meter mechanism embodying the invention;

Figs. 2 and 3 are enlarged fragmentary sections through other forms of meter disc and spindle mechanisms.

Objects of the invention are to eliminate or effectively damp humming noises in electricity meters, and to this end to provide resilient transverse movement of the meter spindle, and preferably of a portion of the spindle; to provide such resilient movement in desired and effective relation with the cooperating meter elements, and without disturbing the structure or operation of the meter bearings, or requiring any special form of spindle bearings; to provide rigid driving connections between the driven disc and the register, while effecting the noise-eliminating transverse resilient spindle movement; to provide the foregoing means and functions and also to provide fixed and simple bearings for the spindle; to provide embodiments realizing the aforesaid objects without disturbing or impairing the other functions of the metering and registering means; to provide simple, strong and reliable means realizing the stated objects, together with others hereinafter pointed out or flowing from the novel features of the invention.

Referring now in detail to the embodiment of the invention illustrated by way of example in the accompanying drawing, the principal parts of an electricity meter are shown, partly diagrammatically, in Fig. 1. Pressure coil 1, wound on a core 2, and current coils 3, wound on a core 4, act to drive the meter disc 5 and its spindle 6, the spindle having a top bearing 7 and a bottom bearing 8. There are suitable driving means between the spindle 6 and a register 9, comprising a worm 10 fixed on the spindle, the worm being in mesh with a worm wheel 11 connected by gearing to the register 9.

In the embodied form of the invention shown in Fig. 1 a hollow, downwardly open hub 17 is fixed to the disc 5, and also to the spindle 6 at some distance above the plane of the disc 5. The spindle 6 is shown as having two separate rigid parts or members, the upper rigid portion 18 carrying the worm 10 and the hub 17, and thereby the rotating disc 5. This part of the spindle, and the drive therefrom to the register, constitutes a continuous rigid connection from the meter disc to the register. The bottom rigid part 19 of the spindle is journaled in the bottom end bearing 8, and the two spaced-apart ends of the aligned spindle portions 18 and 19 are located within the hollow hub 17. The transversely resilient connection between said parts 18 and 19 comprises a spiral spring 20, which fits tightly onto the ends of the two spindle parts 18 and 19, and extends across the intervening gap, thereby constituting a transversely resilient movable juncture in this median portion of the spindle, between the upper rigid part 18 and the bottom rigid part 19. This resilient connection is preferably enclosed within and protected by the hollow hub 17 with ample clearance.

In Fig. 2 of the drawing, the meter spindle is shown of continuous or unitary structure throughout its length, the median transversely resilient portion being integral with, or connected to, the upper and lower rigid portions of the spindle. In this form, the median portion 23 is of greatly reduced diameter as compared with the portions 18ª and 19ª, and constitutes a spring rod, and thereby gives the desired transverse resilient movement. The hub 17ª is relatively long, and the upper part of the hub is drawn at its upper end onto and fixed firmly on the lower part of the rigid shaft portion 18ª, the long, hollow hub enclosing the thin resilient part of the spindle with ample sidewise clearance. The thin resilient part 23 of the spindle extends down to the plane of the disc 5, and has a length which is many times the diameter of the large part 18ª of the spindle. Suitable openings 24 are provided in the hub, if desired, to permit the insertion of a tool to straighten the part 23, in case it becomes bent, or for any other desired or required purpose.

In the form exemplarily shown in Fig. 3, the relatively thin, transversely resilient reduced portion, or spring rod portion 23$^b$ of the spindle is relatively short and is located relatively far from the driving disc 5 and close to the worm 10. In this construction the hollow hub 17$^b$ fixed to the disc 5 is of greatly elongated form, extending upwardly to enclose the thin, resilient spindle part 23$^b$, and the upper end of the hub, above the part 23$^b$, is tightly drawn onto, or otherwise firmly fixed to the rigid spindle portion 18$^b$ closely below the worm 10. In this construction the hollow hub 17$^b$ of the disc 5 and the relatively long lower rigid section 19$^b$ of the spindle, which lies with suitable lateral clearance within the hub, are of relatively great length, that is, there is a very long leverage from the driving disc 5 to the transversely resilient or spring rod part 23$^b$ of the spindle, which arrangement is especially advantageous in damping the humming noise.

Through the application of my invention in some suitable form, the rotor spindle can yield resiliently in a radial direction, and thereby the oscillations of the rotor system which result from the electromagnetic flux acting on the driving disc are taken up, so that the transmission of these oscillations, which are liable to cause a humming noise, are cut off from the footstep or bottom bearing, or at least are so far neutralized or damped that it practically eliminates any humming noise.

The invention in its broader aspects is not limited to the specific mechanisms shown and described but departures may be made therefrom within the scope of the accompanying claims without departing from the principles of the invention and without sacrificing its chief advantages.

What I claim is:

1. An electricity meter having a driven disc and spindle, the spindle having rigid end parts and an integral medial transversely resilient spring rod part of less diameter than said rigid end parts.

2. In an electricity meter, a driven disc and spindle, said spindle having a rigid upper part and a medial transversely resilient part, a long hollow hub connecting said disc and said upper rigid part of the spindle and enclosing said resilient part of the spindle, said resilient part being relatively short and located nearer the juncture of the hub and spindle than to the disc.

3. In an electricity meter, a driven disc and spindle, said spindle having a rigid upper part and a relatively long rigid lower part and a relatively short medial transversely resilient part, a long hollow hub connecting said disc and said upper rigid part of the spindle above and adjacent to said transversely resilient part, the lower rigid part of the spindle extending upwardly within the hollow hub with lateral clearance within the hub.

JOSEF INDERGAND.